Patented Jan. 19, 1943

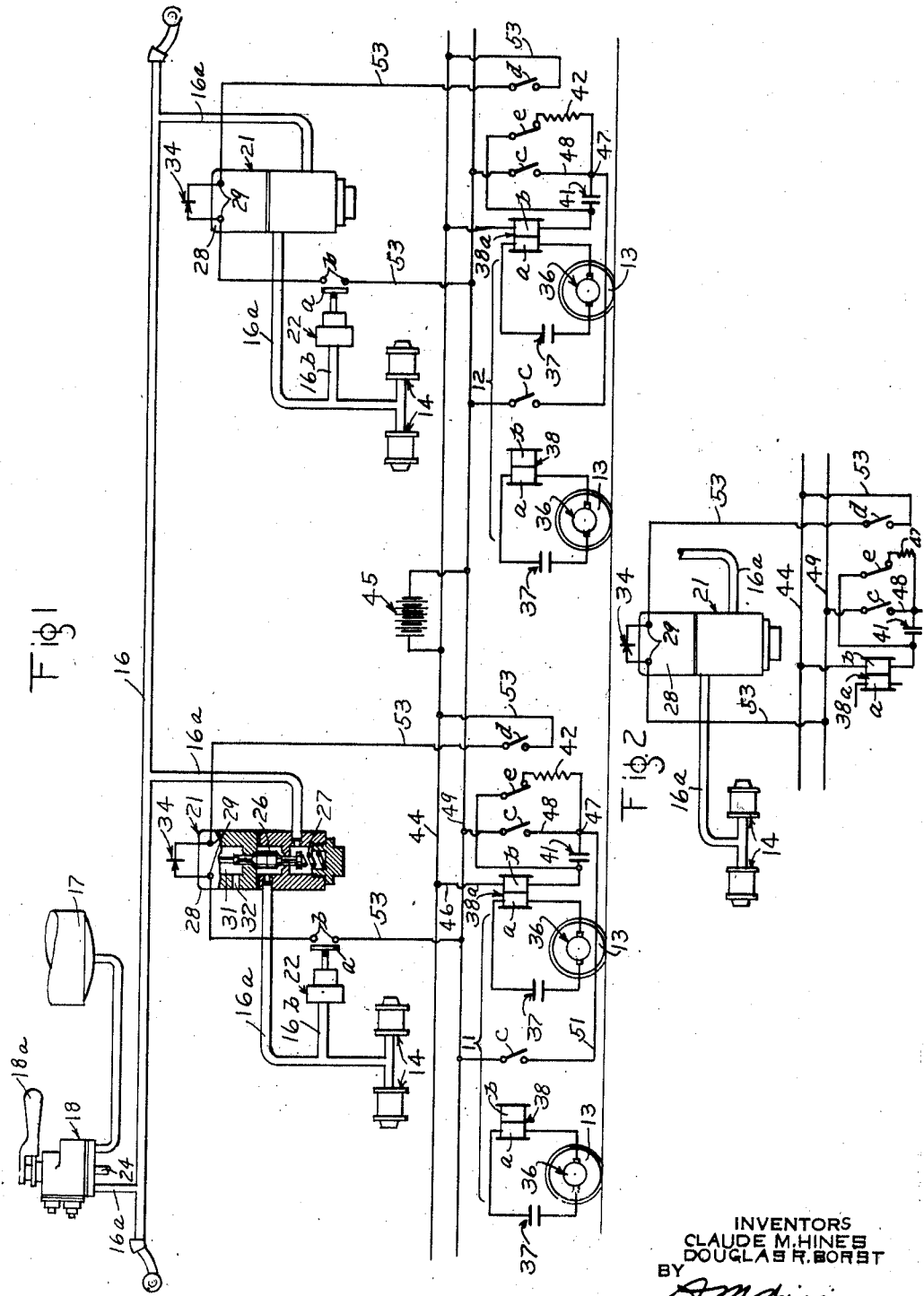

2,308,878

UNITED STATES PATENT OFFICE 2,308,878

BRAKE CONTROL MEANS

Claude M. Hines, Pittsburgh, and Douglas R. Borst, Pitcairn, Pa., assignors to The Westinghouse Air Brake Company, Wilmerding, Pa., a corporation of Pennsylvania Application September 27, 1941, Serial No. 412,562

3 Claims. (Cl. 303—21)

This invention relates to brake control means for vehicles, such as railway cars and trains, and has particular relation to apparatus automatically responsive to the slipping of a vehicle wheel for causing a rapid reduction in the degree of application of the brakes associated with the wheel so as to cause the wheel to be restored to vehicle speed without reducing in speed to a locked condition and sliding.

In the present application, the term "slipping condition" refers to the rotation of a vehicle wheel at a speed less than a speed corresponding to vehicle speed at a given instant whereas the term "sliding condition" refers solely to the dragging of a vehicle wheel along a road surface or rail in a locked or non-rotative condition.

It is well known that if the degree of application of the brakes on a vehicle wheel is such as to exceed the limit of adhesion between the wheel and the rail or road surface on which it rolls, the wheel will decelerate at an abnormally rapid rate to a locked condition and slide. It has, moreover, been demonstrated that if the degree of application of the brakes on the wheel is rapidly reduced, substantially upon the instant that the wheel begins to decelerate at the abnormally rapid rate, that is to slip, the wheel will cease to decelerate and accelerate back toward a rotational speed corresponding to vehicle speed without reducing to a locked condition and sliding. It is of course desirable to prevent sliding of the vehicle wheels particularly railway car wheels, in order to prevent the development of flat spots necessitating repair or replacement of the wheels.

Various types of devices have been proposed for recognizing the abnormal rate of rotative deceleration of the vehicle wheel incidental to the slipping thereof for the purpose of controlling suitable apparatus to effect the rapid reduction in the degree of application of the brakes associated with the vehicle wheel.

There is disclosed and claimed in the copending application Serial No. 342,941 of Andrew J. Sorensen, filed June 28, 1940, now Patent 2,257,311 assigned to the assignee of the present application an electrical type of apparatus adapted to recognize the slipping condition of the vehicle wheel. Such electrical apparatus includes a direct-current generator driven according to the rotation speed of the vehicle wheel for supplying a voltage substantially proportional to rotational speed of the wheel and having a circuit associated with the generator including a condenser and the winding of a relay. The arrangements is such that the relay is operated to its picked-up position only in response to a current in one certain direction exceeding a certain value. This current is produced by the discharge of the condenser in response to the reduction of the voltage supplied by the generator at a rate exceeding a certain rate occurring only when the wheel slips.

In the aforementioned Sorensen patent, upon the restoration of the slipping wheel back toward a speed corresponding to vehicle speed, current is supplied to charge the condenser and is in the reverse direction to that required to cause pick-up of the wheel slip responsive relay so that this relay would drop-out unless otherwise prevented. In the Sorensen patent the drop-out of the wheel slip responsive relay in response to the acceleration of the slipping wheel back toward a rotational speed corresponding to vehicle speed is prevented by means of a holding circuit for energizing an auxiliary winding of the relay which circuit includes a pressure operated switch responsive to the reduction of the pressure in the brake cylinder below a certain pressure to interrupt the holding circuit. In the Sorensen patent, therefore, the reduction in brake cylinder pressure initiated in response to the pick-up of the wheel slip responsive relay continues once it is initiated until the pressure operated switch opens, thereby insuring a sufficient reduction of the pressure in the brake cylinder to insure the restoration of the slipping wheel back toward vehicle speed and at the same time preventing the restoration of pressure in the brake cylinder and the consequent reapplication of the brakes until the slipping wheel has been substantially fully restored to vehicle speed.

It is possible, however, that the pressure operated switch may stick in its closed position and fail to open in response to the reduction of brake cylinder pressure initiated in response to slipping of the wheel. In such case, the brakes on the slipping wheel would continue to remain released. This is undesirable since the length of the stopping distance is necessarily correspondingly lengthened. Moreover, if such continued release of the brakes occurs simultaneously on a sufficient number of the wheels the lengthening of the stopping distance may be intolerable from a safety standpoint.

It is accordingly an object of our invention to guard against failure of the pressure operated switch, in equipment of the type disclosed in the Sorensen Patent 2,257,311, to open properly and to cause the reapplication of the brakes on a slipping wheel in the event of the failure of the pressure operated switch to open as it should.

It is another object of our invention to provide a vehicle brake control equipment of the type including apparatus for initiating a reduction in the degree of application of the brakes associated with the wheel at the time it begins to slip and characterized by means for causing reduction in the degree of application of the brakes associated with a slipping wheel to continue only for a certain limited time following the instant that the wheel begins to slip, independently of the degree of reduction of pressure in the brake cylinder controlling the brakes.

It is another object of our invention to provide vehicle brake control equipment of the type indicated in the foregoing object and further characterized by an arrangement including an electroresponsive device energized by current supplied to charge a condenser at the time slipping of the wheel is initiated for causing the reduction in the degree of application of the brakes initiated in response to slipping of the wheel to continue for only a certain length of time following the instant the wheel begins to slip.

The above objects, and other objects of our invention which will be made apparent hereinafter, are attained by means of several embodiments of our invention subsequently to be described and shown in the accompanying drawing wherein:

Fig. 1 is a simplified diagrammatic view, showing a vehicle brake control equipment embodying our invention and, Fig. 2 is a fragmental diagrammatic view, illustrating a modification of the first embodiment.

*Description of embodiment shown in Fig. 1*

Referring to Fig. 1, a brake control equipment for a railway car having two wheel trucks 11 and 12 at opposite ends thereof is shown. Each wheel truck is of the four-wheel type having two wheel-and-axle units or assemblies, each wheel-and-axle unit having two wheels 13 fixed at opposite ends of a connecting axle. It will be understood that only one wheel of each wheel-and-axle unit is visible in the drawing. Although the term "wheel unit" as employed herein may refer to two wheels and a connecting axle it should be understood that such term may also designate a single wheel.

The brakes associated with the car wheels 13 may be of the conventional clasp arranged shoe type engaging the periphery of the car wheel and adapted to be applied and released through the intervening brake levers and brake rigging in response to the supply of fluid under pressure to and the release of fluid under pressure from one or more brake cylinders 14. While any suitable number of brake cylinders may be provided for each wheel truck, we have illustrated two brake cylinders for each wheel truck, one brake cylinder being effective to operate the brakes associated with one wheel unit and the other brake cylinder being adapted to operate the brakes associated with the other wheel unit.

While in practice, it is intended to control the supply of fluid under pressure to and the release of fluid under pressure from the brake cylinders on a car under the control of the operator by conventional fluid pressure brake control apparatus, such as indicated in the aforementioned Sorensen patent, we have for purposes of simplicity shown a fluid pressure brake control equipment of the straight-air type. Such control apparatus may comprise a train pipe hereinafter referred to as a control pipe 16, a reservoir 17 normally charged to a suitable pressure such as one hundred pounds per square inch from a fluid compressor not shown, a brake valve device 18 of the self-lapping type for controlling the supply of fluid under pressure from the reservoir 17 to the control pipe 16 and the release of fluid under pressure from the control pipe, a magnet valve device 21 for each wheel truck, and a pressure operated switch 22 for each wheel truck.

The brake valve device 18 is of the self-lapping type described and claimed in Patent 2,042,112 to Ewing K. Lynn and Rankin J. Bush. Since reference may be had to the patent, the brake valve device is here shown only in outline form and will be but briefly described. The brake valve device 18 comprises a supply valve and a release valve operated by a rotary operating shaft having a brake valve handle 18a thereon. In the normal or brake release position of the brake valve handle 18a the supply valve is closed and the release valve is open. With the release valve open, fluid under pressure is exhausted from the control pipe 16 through a branch pipe 16a, connecting the control pipe and brake valve device, to atmosphere through an exhaust port and pipe 24 at the brake valve. When the brake valve handle 18a is shifted out of its brake release position into its application zone the release valve is closed and the supply valve is opened. With the supply valve open, communication is established between the reservoir 17 and the control pipe 16 thereby causing the control pipe to be charged with fluid under pressure.

The character of the valve mechanism of the brake valve device 18 is such as to limit the pressure of the fluid supplied to the control pipe in accordance with the degree of displacement of the brake valve handle out of its brake release position. Moreover, the valve mechanism has a pressure-maintaining feature in that if the pressure in the control pipe tends to reduce for any reason, such as leakage, the valve mechanism operates automatically to continue the supply of fluid under pressure to the control pipe to maintain a pressure therein corresponding to the position of the brake valve handle. This pressure-maintaining feature will be referred to hereinafter.

The magnet valve devices 21 are identical and accordingly only one is shown partially in section and will be but briefly described.

The magnet valve devices 21 are of standard double beat type comprising a casing containing a double beat valve 26 which is biased to an upper seated position by a coil spring 27 and actuated to a lower seated position in response to energization of a magnet winding or solenoid 28, the two terminals 29 of which are shown. In its upper seated position, the double beat valve 26 establishes communication past its lower valve seat from one section of a branch pipe 16a of the control pipe to another section of the same pipe having two branches connected to the two brake cylinders 14 for the corresponding truck.

In the lower seated position of valve 26, communication between the two sections of the branch pipe 16a is closed and communication established from the section connected to the brake cylinders to a chamber 31 constantly connected to atmosphere through a relatively large exhaust port 32.

It will thus be seen that when the magnet winding of the magnet valve device 21 is deenergized, fluid under pressure may be supplied to and released from the brake cylinders through the branch pipe 16a in accordance with variations of pressure in the control pipe 16. On the other hand when the magnet winding 28 of the magnet valve device 21 is energized, fluid under pressure is rapidly exhausted from the brake cylinders 14 independently of the pressure in the control pipe to effect a rapid release of the brakes controlled by the brake cylinders.

Connected across the terminals 29 of the magnet winding 28 of each magnet valve device 21 is an asymmetric device, such as a rectifier 34 of the dry disk or tube type, the purpose of which will be explained hereinafter.

The pressure operated switches 22 are shown only diagrammatically but it is intended that they be of the type shown and claimed in Patent No. 2,096,492 to E. E. Hewitt. Briefly, each of the pressure operated switches comprises a movable contact $a$ and two insulated stationary contacts $b$. The movable contact $a$ is operated in response to the supply of fluid under pressure through a branch pipe 16b of the brake cylinder section of pipe 16a and acting on one side of a diaphragm or piston. The character of the switch device is such that the movable contact $a$ is biased to a position out of engagement with the stationary contact $b$ until the pressure supplied to the brake cylinders exceeds a certain low pressure such as fifteen pounds per square inch. At such time, the movable contact $a$ is snapped suddenly into engagement with the stationary contacts $b$. The movable contact $a$ remains in engagement with the contact $b$ until the pressure reduces somewhat below fifteen pounds per square inch pressure, at which time movable contact $a$ is snap-actuated out of engagement with the contacts $b$.

The equipment shown further includes apparatus responsive to the slipping of any of the wheels on a given truck for causing energization of the magnet winding of the magnet valve device 21. Such apparatus includes a suitable generator 36 of the direct-current type for each wheel unit, adapted to be driven at a speed corresponding to the rotational speed of the wheel unit in any suitable manner. As shown, the generators 36 are indicated as mounted at the outer end of an axle journal with the armature shaft of the generator coupled in coaxial relation to the axle of the wheel unit.

Associated with one generator 36 of each truck are an electrical condenser 37 of suitable capacity and a unidirectional relay 38. Associated with the other generator 36 of each truck are a condenser 37 and a unidirectional relay 38a.

Each of the relays 38 and 38a has two separate windings $a$ and $b$ respectively. Relays 38 have only a single front contact $c$ while the relays 38a have two front contacts $c$ and $d$ and a back contact $e$.

It will be understood that the term "front contact" designates a contact which is biased to open position when the armature of the relay is dropped-out and which is actuated to a closed position when the armature of the relay is picked-up. It will also be understood that the term "back contact" refers to a contact which is biased to a closed position when the armature of the relay is dropped-out and which is actuated to an open position when the armature is picked-up.

A condenser 37 and the winding $a$ of each relay 38 are connected in serial relation across the terminals of the corresponding generator 36 associated with one wheel unit of each truck. In a similar manner, a condenser 37 and the winding $a$ of each relay 38a are connected in serial relation across the terminals of the corresponding generator 36 associated with the other unit of each truck.

The character of the relays 38 and 38a is such that when the winding $a$ thereof is energized by a current exceeding a certain value and flowing in one certain direction therethrough, the contacts of the relays are actuated to the picked-up position thereof. As will be explained presently, the winding $b$ of the relays 38 are holding windings adapted to be energized to hold the contact in picked-up position independently of the energization of the winding $a$ or to cause the relay to be picked-up independently of the energization of the winding $a$.

It is here assumed that the polarity of the generators 36 for any given direction of rotation of the vehicle wheel is such that, upon rotative acceleration of the wheels and the consequent increase of generator voltage, current is supplied to charge the condensers 37 in a direction so that the flow of current through the winding $a$ of the relays 38 and 38a is in the direction opposite to that required to cause pickup of the relays. Conversely it is also assumed that the current discharged from the condenser 37, in response to rotative deceleration of the wheels and the consequent reduction of the generator voltage, is in the proper direction through the winding $a$ of the relays 38 and 38a to cause pick-up of the contacts of the relay.

Obviously the polarity of the terminals of the generators 36 reverses automatically with the reversal in the direction of rotation of the wheels for well known reasons. If, therefore, it is desired to operate the vehicle in the reverse as well as the forward direction, suitable reversing switch mechanism is required in order to reverse the connections of the condensers 37 and relays 38 to the generator terminals so as to maintain a uniform polarity of voltage impressed on the condenser and relay. Such a reversing mechanism is fully described in the above-mentioned Sorensen application 342,941. It is omitted from the present application in the interest of simplicity but it will be understood that we contemplate the reversal of the connections of the condenser 37 and relay 38 to the terminals of the generators 36 automatically upon a reversal in the direction of rotation of the vehicle wheels in a manner similar to that described in the Sorensen application.

The capacity of the condensers 37 is such and the winding $a$ of the relays 38 and 38a is so designed that the current sufficient to cause pick-up of the contacts of the relays is not produced unless the wheels begin to slip. It will be understood that the current supplied to charge each condenser 37 or discharged from each condenser 37 is substantially proportional to the rate of increase and reduction of the corresponding generator voltage, respectively. Thus when the voltage of the generator associated with a wheel unit reduces at a rate corresponding to a slipping rate of deceleration of the wheel, a sufficient current is produced and flows through the winding of the relays 38 and 38a to cause pick-up of the contacts of the relays.

Associated with each of the relays 38a is a condenser 41 and a resistor 42. The back contact e of each relay 38a is effective in its dropped-out or closed position to establish a circuit including the corresponding condenser 41 and resistor 42 in serial relation whereby to effect the complete dissipation of the electrical charge on the condenser 41. Resistor 42 limits the current discharged from the condenser 41.

The contacts c of the relays 38 and 38a for each wheel truck are arranged in parallel-relation so that, upon pick-up of either the relay 38 or the relay 38a, a circuit is established for charging the condenser 41 through a circuit including the holding winding b of the relay 38a. This circuit may be traced from a so-called positive bus wire 44, which is connected to the positive terminal of a suitable source of direct-current such as a storage battery 45, by way of a wire 46 including the winding b of the relay 38a and the condenser 41 in serial relation to the point 47, whence the circuit divides into two parallel branches, one branch of which extends by way of a wire 48 including the contact c of relay 38a to a negative bus wire 49 that is connected to the negative terminal of the storage battery 45, and the other branch of which extends by way of a wire 51 including the contact c of the relay 38 to the negative bus wire 49.

The capacity of the condenser 41 and the design of the winding b of the relay 38a is such that, upon the pick-up of either of relay 38 or the relay 38a and the consequent closure of the corresponding contact c thereof, the current supplied to charge the condenser 41 energizes the winding b of the relay 38a in a direction to cause pick-up of the contacts of the relay or to maintain the contacts picked-up if previously picked-up by winding a of the relay. Moreover, the condenser charging current remains sufficient to maintain the contacts of the relay 38a picked-up for a certain predetermined time selected as hereinafter explained.

The magnet winding 28 of each magnet valve device 21 is connected in serial relation with the contacts of the associated pressure switch 22 and contact d of the relay 38a of the corresponding wheel truck in a wire 53 that is connected at one end to the positive bus wire 44 and at the other end to the negative bus wire 49. Energization and deenergization of the magnet winding 28 of each magnet valve device 21 is accordingly controlled jointly by the pressure switch and contact d of relay 38a in a manner to be described more fully hereinafter.

*Operation of equipment shown in Fig. 1*

Let it be assumed that a car having the equipment shown in Fig. 1 is traveling under propulsion power with the brake valve handle 18a in brake release position so that the brakes on the car are released and that the operator desires to apply the brakes to bring the car to a stop. To do so the operator first shuts off the propulsion power and then shifts the brake valve handle 18a into its application zone an amount corresponding to the desired degree of brake application. The control pipe 16 is accordingly charged to a pressure, such as fifty pounds per square inch, corresponding to the position of the brake valve handle. Fluid under pressure is accordingly supplied through the several branch pipes 16a to the brake cylinders of each wheel truck 11 and 12, the pressure established in the brake cylinders corresponding to that established in the control pipe 16. The brakes are accordingly applied on the car to a degree corresponding to the pressure established in the brake cylinders.

As the speed of the car reduces, the operator may desire to reduce the degree of application of the brakes. To do so he merely shifts the brake valve handle 18a back toward its brake release position, thereby correspondingly reducing the pressure in the control pipe 16 to a lower pressure such as forty pounds per square inch. Fluid under pressure is accordingly released from the brake cylinders 14 reversely to the control pipe and thence to atmosphere through the exhaust port 24 of the brake valve until the reduced pressure is established in the brake cylinders.

As long as none of the wheels on the car begin to slip, no variation of the brake cylinder pressure occurs except under the control of the operator.

When the car comes to a complete stop, the operator may release the brakes merely by restoring the brake valve handle 18a to its brake release position to effect the complete exhaust of fluid under pressure from the control pipe 16 and correspondingly from the brake cylinders 14.

If upon the initiation of a brake application or at any time during a brake application, one or more wheel units on the car begin to slip, a further operation occurs which will now be described. Let it be assumed that during a brake application, the right-hand wheel unit of wheel truck 11 begins to slip. In such case the contacts of the relay 38a corresponding to such wheel unit are actuated to the picked-up position thereof. The magnet winding of the magnet valve device 21 for the wheel truck 11 is thus energized in response to the pick-up of the contact d of the relay 38a, it being understood that the contacts of the associated pressure switch 22 have previously closed in response to the pressure established in the brake cylinders.

The contact c of the relay 38a is effective in its picked-up position to establish the circuit, previously described, for causing charging of condenser 41 and the consequent energization of the winding b of the relay 38a subsequent to the interruption of the discharge circuit including the resistor 42 for the condenser 41 in response to the actuation of the back contact e of relay 38a to its open position.

The magnet valve device 21 is accordingly operated, in response to the energization of the magnet winding 28 thereof, to cause the rapid exhaust of fluid under pressure from the brake cylinders 14 and the consequent rapid reduction in the degree of application of the brakes associated with the wheels of truck 11.

Due to the rapid reduction of pressure in the brake cylinders 14 substantially at the instant slipping of the wheels begins, the slipping wheels promptly cease to decelerate and begin to accelerate rapidly back toward a rotational speed corresponding to car speed. Due to the fact that the winding b of relay 38a is being energized by the current supplied to charge condenser 41 at this time, the reversal of the current through the winding a of relay 38a due to the acceleration of the wheel is not effective to cause drop-out of the contacts of the relay. The circuit for energizing the magnet winding 28 of the magnet valve device 21 is thus maintained closed as the slipping wheels accelerate back toward a speed corresponding to car speed.

The actual time elapsing from the instant the wheels begin to slip until they are restored fully to a speed corresponding to car speed may be of the order of one or one-and-a-half seconds. However, the pressure in the brake cylinders 14 does not reduce sufficiently to cause separation of the contacts of the pressure switch 22 until after the wheels are fully restored to a speed corresponding to car speed. Thus, when the contacts of the pressure switch 22 are restored to open position the slipping wheels are again rotating at a speed corresponding to car speed and decelerating at a rate corresponding to the rate of retardation of the car.

Upon the opening of the contacts of the pressure switch 22 the magnet winding 28 of the magnet valve device 21 is deenergized thereby terminating the exhaust of fluid under pressure from the brake cylinders 14 and reestablishing the supply communication through the branch pipe 16a from the control pipe 16 to the brake cylinders. Fluid under pressure is accordingly resupplied to the brake cylinders 14 to effect a reapplication of the brakes associated with the wheels of truck 11.

The supply of fluid under pressure to the previously vented brake cylinders 14 of wheel truck 11 tends to reduce the pressure in the control pipe 16. Due to the pressure-maintaining feature of the brake valve device 18, however, fluid under pressure is automatically supplied to the control pipe 16 to maintain a pressure therein corresponding to the position of the brake valve handle. Thus, upon the deenergization of the magnet winding 28 of the magnet valve device 21, fluid under pressure is accordingly resupplied to the brake cylinders to a degree corresponding to the pressure established in the control pipe 16.

If, upon reapplication of the brakes following slipping of the wheels, the wheels again begin to slip, the above operation is repeated so that at no time are the wheels permitted to decelerate to a locked condition and slide.

It is possible that the contacts of the pressure switch 22 may fail to open in response to the reduction of the pressure in the brake cylinders 14 resulting from the energization of the magnet winding 28 of the magnet valve device 21. In such case, however, the circuit for energizing the magnet winding 28 of the magnet valve device 21 is nevertheless interrupted due to the opening of the contact d in response to the drop-out of the relay 38a. As previously indicated, the current supplied to charge condenser 41 and energize the winding b of the relay 38a endures for a certain length of time sufficient to maintain the relay picked-up. This time is selected to be slightly greater than the time normally required for the contacts of the pressure switch 22 to open following energization of the magnet winding 28 of the magnet valve device 21. Of course, the time required for the contacts of the pressure switch 22 to open following the instant the magnet winding 28 of the magnet valve device 21 is energized, depends upon the pressure established in the brake cylinders the time being longer for the higher pressures established in the brake cylinders. However, the time during which condenser 41 is charged by current sufficient to maintain relay 38a picked-up is sufficiently long to normally permit the contacts of the pressure switch 22 to function to interrupt the circuit for energizing the magnet winding 28 of the magnet valve device 21.

Upon the separation of the contacts of the pressure switch 22 or the drop-out of the contact d of relay 38a, the momentary current induced in the magnet winding 28 of the magnet valve 21 might cause excessive arcing at the contacts, resulting in undesirable burning or pitting thereof. The rectifier 34 shunting the magnet winding 28 of the magnet valve device 21 accordingly functions to provide a local discharge circuit for dissipating the current induced in the magnet winding 28 to thereby minimize arcing at the contacts of the pressure switch 22 and at contact d of the relay 38a in well-known manner.

It is desirable that the condenser 41 be completely discharged prior to pick-up of the relay 38a in order to insure the proper charging current so as to permit energization of the winding b of the relay 38a to a sufficient degree to cause pick-up thereof and maintenance of the contacts of the relay in its picked-up position for the desired length of time. The back contact e of relay 38a is accordingly effective, when the contacts of the relay are restored to the dropped-out position thereof, to establish the local discharge circuit including the resistor 42, thereby causing the condenser 41 to be completely discharged. The resistor 42 limits the discharge current to such a value as to prevent undesirable burning of the contacts e, which burning might otherwise occur.

In the event that the wheels of the left-hand wheel unit of wheel truck 11 begin to slip during a brake application while those of the right-hand wheel unit do not slip, it will be seen that contact c of the corresponding relay 38 is picked-up to cause current to be supplied to charge condenser 41 associated with the relay 38a of the right-hand wheel unit, such charging current energizing the winding b of the relay 38 to a sufficient degree to cause pick-up of the contacts thereof, independently of the energization of the winding a of the relay 38a. Once the relay 38a is picked-up in response to the pick-up of the relay 38, the operation is the same as above described.

It would appear that the winding b of relay 38 has no utility and such is actually the case as shown. As a practical matter, however, in the manufacture of relays 38 and 38a it is desirable to eliminate the necessity for the design of two different relays. Relay 38 is therefore designed and constructed in the same manner as the relay 38a, that is having two windings a and b, the only difference in the relays being in the number of contacts provided. If desired, therefore, the relays 38 need only have a single winding corresponding to the winding a.

When the car comes to a complete stop following a brake application during which slipping of the wheels occurred, the magnet valve device 21 is always restored to its normal condition establishing communication between the brake cylinders and the control pipe 16. The brakes on the car thus remain applied while the car is stopped until released by the operator prior to again starting of the car.

The magnet valve device 21 for wheel truck 12 is controlled by the corresponding relays 38 and 38a in the same manner as just described for the magnet valve device 21 of wheel truck 11 and accordingly a description of such operation is not repeated.

*Embodiment shown in Fig. 2*

Referring to Fig. 2, a modification of the equipment shown in Fig. 1 is provided which differs therefrom merely in the omission of the pressure switch 22 associated with the brake cylinders of each wheel truck. In this equipment therefore, the deenergization of the magnet winding 28 of each magnet valve device 21 is always effected in response to the drop-out of the contact d of the corresponding relay 38a. The two equipments being otherwise identical, the above description of the embodiment shown in Fig. 2 is deemed sufficient.

As a practical matter, the pressure switch 22 may be desirable because the contacts of the pressure switch 22 are able to interrupt higher currents without damage than are the relatively light relay contacts. Although the contacts of the relays 38a are capable of interrupting the current energizing the magnet winding 28 of the magnet valve device 21, they may burn or pit more readily than those of the pressure switch thus requiring repair or replacement more frequently than if the pressure switch 22 were employed.

*Summary*

Summarizing, it will be seen that we have disclosed a brake control equipment for railway cars and trains of the type having means responsive to the slipping of wheels for causing instantaneously a rapid reduction in the degree of application of the brakes and characterized by an arrangement, including a normally discharged condenser adapted to be charged in response to the initiation of wheel slip, for the purpose of maintaining a continued reduction in the degree of application of the brakes for a certain length of time before permitting reapplication of the brakes.

The apparatus may be employed, if desired, in connection with means responsive to the reduction in the degree of application of the brakes below a certain degree which normally functions to terminate the reduction in the degree of application of the brakes initiated in response to slipping of the wheels, so that if said means fails to operate in its proper manner the reduction in the degree of brake application is nevertheless terminated after the expiration of a certain time following the instant the wheels begin to slip.

In the prior copending application Serial No. 412,545 of Andrew J. Sorensen, filed September 27, 1941, as well as the copending application, Serial No. 439,526, filed April 18, 1942, of Claude M. Hines, one of the present joint applicants, brake control equipments are disclosed including an arrangement, somewhat analogous to that disclosed in the present application, for causing the reduction in the degree of application of the brakes associated with a vehicle wheel, initiated in response to slipping of the wheel, to be terminated at the expiration of a certain length of time following the instant the wheel begins to slip. The invention disclosed in the present application is accordingly not claimed in its broadest scope in view of the subject matter claimed in said copending applications.

Having now described our invention, what we claim as new and desire to secure by Letters Patent, is:

1. In a vehicle brake control equipment of the type in which the brakes associated with the vehicle wheels are applied and released under the control of the operator, the combination of control means operative to effect a reduction in the degree of application of the brakes associated with a wheel of the vehicle, means responsive to the slipping of said wheel for causing a continuing operation of said control means, a normally discharged condenser, means controlled by said wheel-slip responsive means and effective when said wheel begins to slip for causing current to be supplied to charge said condenser, and means responsive to the current supplied to charge said condenser for preventing said control means from remaining effective to continue the reduction in the degree of application of the brakes associated with said wheel longer than a certain limited length of time following the instant the wheel begins to slip.

2. In a vehicle brake control equipment of the type in which the brakes associated with the vehicle wheels are applied and released under the control of the operator of the vehicle, the combination of control means operative to effect reduction in the degree of application of the brakes associated with a wheel of the vehicle, means responsive to the slipping of said wheel for causing a continuing operation of said control means, means controlled according to the degree of application of the brakes associated with said wheel and effective in its normal manner of operation to cause said control means to terminate further reduction in the degree of application of the brakes when the degree of application of the brakes reduces below a certain value, a normally discharged condenser, means controlled by said wheel-slip responsive means and effective upon slipping of said wheel for causing a current to be supplied to charge said condenser, and means responsive to the diminution below a certain value of the current supplied to charge said condenser for causing said control means to terminate the reduction in the degree of application of the brakes if such reduction is not sooner terminated in response to the operation of the said application controlled means.

3. In a vehicle brake control equipment having a control device effective while in an operated condition to cause a continuing reduction in the degree of application of the brakes associated with a wheel of the vehicle, the combination of means effective to cause operation of the control device to its operated condition in response to the slipping of said wheel, a normally discharged condenser, means controlled by said wheel slip responsive means and effective when the said wheel begins to slip for causing current to be supplied to charge said condenser, and means responsive to the current supplied to charge said condenser for causing said control means to continue to effect reduction in the degree of application of the brakes associated with said wheel for a certain limited length of time following the instant the wheel begins to slip.

4. In a vehicle brake control equipment of the type in which the brakes associated with the wheels of the vehicle are applied and released under the control of the operator of the vehicle, the combination of a relay having two separate windings one of which is effective when energized by a current exceeding a certain value for causing pick-up of the relay and the other of which is effective when energized by a current exceeding a second certain value for also causing pick-up of said relay, means for causing energization of said one winding of said relay by a current exceeding said one certain value as long as a vehicle wheel rotatively decelerates at a rate exceeding a certain rate, an electrical condenser, means responsive to the pick-up of said relay for causing a current to be supplied through said other winding of said relay to charge said condenser, said condenser charging current exceeding said second certain value of current for a certain length of time whereby to maintain said relay picked-up for a certain length of time, and electroresponsive means controlled by said relay for causing a continued reduction in the degree of application of the brakes associated with said wheel as long as said relay is picked-up.

5. In a vehicle brake control equipment of the type in which the brakes associated with the wheels of the vehicle are applied and released under the control of the operator of the vehicle, the combination of a relay having two separate windings one of which is effective when energized by a current exceeding a certain value for causing pick-up of the relay and the other of which is effective when energized by a current exceeding a second certain value for also causing pick-up of said relay, means for causing energization of said one winding of said relay by a current exceeding said one certain value as long as a vehicle wheel rotatively decelerates at a rate exceeding a certain rate, an electrical condenser, means responsive to the pick-up of said relay for causing a current to be supplied through said other winding of said relay to charge said condenser, said condenser charging current exceeding said second certain value of current for a certain length of time whereby to maintain said relay picked-up for a certain length of time, a switch device operative to a closed position whenever the degree of application of the brakes associated with said wheel exceeds a certain degree and operative to an open position whenever the degree of application of the brakes associated with said wheels decreases below said certain degree, electroresponsive means effective upon energization to cause reduction in the degree of application of the brakes associated with said wheel, said relay and said switch device being jointly effective when the relay is picked-up and the switch device is in its closed position for causing energization of said electroresponsive means, and severally effective depending upon whether the relay is first dropped-out or the switch device first restored to its open position for effecting deenergization of said electroresponsive means and the consequent termination of the reduction in the degree of application of the brakes.

6. In a vehicle brake control equipment of the type in which the brakes associated with a vehicle wheel are applied and released under the control of the operator of the vehicle, the combination of a relay having two separate windings, one of said windings being effective when energized by a current exceeding one certain value and flowing in one certain direction therethrough for causing the relay to pick-up and the other of said windings being effective when energized by a current exceeding a second certain value and in one certain direction therethrough for causing said relay to be picked-up or maintained picked-up, means for causing said one winding to be energized by a current exceeding said one certain value and flowing in said one certain direction therethrough only so long as said wheel rotatively decelerates at a rate exceeding a certain rate, an electrical condenser, means responsive to the pick-up of said relay for causing a current exceeding said second certain value and in said one certain direction to be supplied through said other winding of said relay to charge said condenser, said current exceeding said second certain value for a certain length of time that is longer than the time that the current in said one certain direction endures in the said one winding, electroresponsive means controlled by said relay and effective as long as said relay is picked-up for causing a continuing reduction in the degree of application of the brakes associated with said wheel, a discharge circuit for said condenser, and means responsive to the drop-out of said relay for establishing said discharge circuit.

7. In a brake control equipment for a vehicle having two separately rotatable wheels and pressure responsive means to which fluid under pressure is supplied and from which fluid under pressure is released for effecting application and release of the brakes associated with said wheels, the combination of valve means normally in a position to permit the supply of fluid under pressure to said pressure responsive means and operative to a different position to cause a rapid reduction of the pressure acting on said pressure responsive means, two relays one of which is associated with one of said wheels and the other of which is associated with the other of said wheels, said one relay having a winding effective when energized by a current exceeding one certain value and flowing in one certain direction therethrough for causing pick-up of the relay, said other relay having two separate windings one of which is effective when energized by a current exceeding one certain value and flowing in one certain direction therethrough for causing said other relay to be picked-up and the other of which is effective when energized by a current exceeding a second certain value and flowing in one certain direction therethrough for causing said other relay to be picked-up or maintained picked-up if it is already picked-up so long as such current endures, means for causing the winding of said one relay to be energized by a current exceeding said one certain value and flowing in said one certain direction therethrough only so long as said one wheel rotatively decelerates at a rate exceeding a certain rate, means for causing the said one winding of said other relay to be energized by a current exceeding said one certain value and flowing in said one certain direction only so long as the other of said wheels rotatively decelerates at a rate exceeding a certain rate, an electrical condenser, and means responsive to the pick-up of either of said relays for causing a current to be supplied to charge said condenser, said current flowing in said one certain direction through the other winding of said other relay and exceeding said second certain value for a certain limited time, said other relay being effective as long as it is in its picked-up position for causing said valve means to be operated to and maintained in its said different position.

8. In a brake control equipment for a vehicle having two separately rotatable wheels and pressure responsive means to which fluid under pressure is supplied and from which fluid under pressure is released for effecting application and release of the brakes associated with said wheels, the combination of valve means normally in a position to permit the supply of fluid under pressure to said pressure responsive means and operative to a different position to cause a rapid reduction of the pressure acting on said pressure responsive means, two relays one of which is associated with one of said wheels and the other of which is associated with the other of said wheels, said one relay having a winding effective when energized by a current exceeding one certain value and flowing in one certain direction therethrough for causing pick-up of the relay, said other relay having two separate windings one of which is effective when energized by a current exceeding one certain value and flowing in one certain direction therethrough for causing said other relay to be picked-up and the other of which is effective when energized by a current exceeding a second certain value and flowing in one certain direction therethrough for causing said other relay to be picked-up or maintained picked-up if it is already picked-up so long as such current endures, means for causing the winding of said one relay to be energized by a current exceeding said one certain value and flowing in said one certain direction therethrough only so long as said one wheel rotatively decelerates at a rate exceeding a certain rate, means for causing the said one winding of said other relay to be energized by a current exceeding said one certain value and flowing in said one certain direction only so long as the other of said wheels rotatively decelerates at a rate exceeding a certain rate, an electrical condenser, means responsive to the pick-up of either of said relays for causing a current to be supplied to charge said condenser, said current flowing in said one certain direction through the other winding of said other relay and exceeding said second certain value for a certain limited time, said other relay being effective as long as it is in its picked-up position for causing said valve means to be operated to and maintained in its said different position, and means responsive to the drop-out of said other relay for causing said condenser to be discharged.

CLAUDE M. HINES.
DOUGLAS R. BORST.